United States Patent
Kodama

(10) Patent No.: US 10,168,453 B2
(45) Date of Patent: Jan. 1, 2019

(54) POLARIZING PLATE PROTECTIVE FILM, POLARIZING PLATE, IMAGE DISPLAY DEVICE, AND METHOD OF MANUFACTURING POLARIZING PLATE PROTECTIVE FILM

(71) Applicant: FUJIFILM Corporation, Tokyo (JP)

(72) Inventor: Tomohiro Kodama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 253 days.

(21) Appl. No.: 15/007,475

(22) Filed: Jan. 27, 2016

(65) Prior Publication Data

US 2016/0245956 A1 Aug. 25, 2016

(30) Foreign Application Priority Data

Feb. 25, 2015 (JP) .................... 2015-035349

(51) Int. Cl.
| | | |
|---|---|---|
| *G02B 1/14* | (2015.01) | |
| *C09D 4/00* | (2006.01) | |
| *C08J 7/04* | (2006.01) | |
| *G02B 5/30* | (2006.01) | |
| *C08F 222/04* | (2006.01) | |
| *C08F 222/10* | (2006.01) | |

(52) U.S. Cl.
CPC .............. *G02B 1/14* (2015.01); *C08F 222/04* (2013.01); *C08F 222/10* (2013.01); *C08J 7/047* (2013.01); *C09D 4/00* (2013.01); *G02B 5/3033* (2013.01); *C08J 2301/10* (2013.01); *C08J 2435/02* (2013.01)

(58) Field of Classification Search
None
See application file for complete search history.

(56) References Cited

U.S. PATENT DOCUMENTS

| | | | |
|---|---|---|---|
| 2007/0042275 A1* | 2/2007 | Kamo ..................... | G03F 7/027 430/1 |
| 2008/0014373 A1 | 1/2008 | Muramatsu et al. | |
| 2009/0130472 A1 | 5/2009 | Kondo et al. | |
| 2012/0208038 A1 | 8/2012 | Kondo et al. | |

FOREIGN PATENT DOCUMENTS

| | | |
|---|---|---|
| JP | 2005-307123 A | 11/2005 |
| JP | 2006-083225 A | 3/2006 |
| JP | 2006-137903 A | 6/2006 |
| JP | 2007-072284 A | 3/2007 |
| JP | 2008-163064 A | 7/2008 |
| JP | 2009-126879 A | 6/2009 |
| JP | 2010-044417 A | 2/2010 |

OTHER PUBLICATIONS

Notification of Reasons for Refusal issued by the Japanese Patent Office on Jan. 9, 2018, in connection with Japanese Patent Application No. 2015-035349.

* cited by examiner

*Primary Examiner* — Sheeba Ahmed
(74) *Attorney, Agent, or Firm* — Edwards Neils, LLC; Jean C. Edwards, Esq.

(57) ABSTRACT

There is provided a polarizing plate protective film including a substrate and a hard coat layer, wherein the hard coat layer is a layer formed by curing a photocurable composition containing a polyfunctional (meth)acrylate compound and an acid anhydride, and a content of the acid anhydride in the photocurable composition is 8% by mass or more based on a total solid content of the photocurable composition.

8 Claims, No Drawings

POLARIZING PLATE PROTECTIVE FILM, POLARIZING PLATE, IMAGE DISPLAY DEVICE, AND METHOD OF MANUFACTURING POLARIZING PLATE PROTECTIVE FILM

CROSS REFERENCE TO RELATED APPLICATION(S)

This The present application claims priority from Japanese Patent Application No. 2015-035349filed on Feb. 25, 2015, the entire disclosure of which is incorporated herein by reference.

BACKGROUND

1. Technical Field

The present invention relates to a polarizing plate protective film, a polarizing plate, an image display device, and a method of manufacturing the polarizing plate protective film.

2. Background Art

In recent years, a liquid crystal display device has been widely used in applications such as a liquid crystal panel of a liquid crystal television, a personal computer, a mobile phone, a digital camera, and the like. In general, the liquid crystal display device has a liquid crystal panel member in which polarizing plates are formed at both sides of a liquid crystal cell, and performs a display by controlling a light from a backlight member by the liquid crystal panel member. The polarizing plate includes a polarizer and its protective film (polarizing plate protective film). A general polarizer is obtained by stretching a polyvinyl alcohol (PVA)-based film stained with an iodine or dichroic dye. As for the protective film, for example, a cellulose acylate film or the like has been used.

While the quality of a recent liquid crystal display device has been enhanced, the applications are diversified, and a demand for durability is becoming strict. In view of durability, for example, stability against environmental changes is required in use in outdoor applications, and in a polarizing plate, it is required to suppress a change of optical characteristics with respect to temperature or humidity changes.

In Japanese Patent Laid-Open Publication No. 2006-083225 (hereinafter referred to as "JP-A-2006-083225"), it has been studied that a film with a low moisture permeability (a low moisture permeability film) is used as a polarizing plate protective film to suppress a deterioration of a polarization performance of a polarizing plate under conditions of high temperature and high humidity. More specifically, JP-A-2006-083225 discloses a film having a cured layer obtained by coating a curable composition on a transparent substrate film and curing the composition, the curable composition containing a compound having a specific cyclic aliphatic hydrocarbon group, and two unsaturated double bond groups in a molecule.

The film disclosed in JP-A-2006-083225 is, particularly, a polarizing plate protective film disposed on the outermost surface at the viewing side of an image display device, and has an excellent hardness, and a predetermined (about 320 g/m²/day) low moisture permeability. However, the inventors of the present invention have conducted studies in order to achieve both a further reduction of a moisture permeability, and a hardness.

Accordingly, an object of the present invention is to provide a polarizing plate protective film with a high hardness and a low moisture permeability.

Another object of the present invention is to provide a polarizing plate having the polarizing plate protective film, an image display device, and a method of manufacturing the polarizing plate protective film.

SUMMARY

Problems to be solved by the present invention may be solved by the following configuration.

[1] A polarizing plate protective film including a substrate and a hard coat layer, wherein the hard coat layer is a layer formed by curing a photocurable composition containing a polyfunctional (meth)acrylate compound and an acid anhydride, and a content of the acid anhydride in the photocurable composition is 8% by mass or more based on a total solid content of the photocurable composition.

[2] The polarizing plate protective film of [1], wherein the acid anhydride is an alicyclic dicarboxylic acid anhydride.

[3] The polarizing plate protective film of [1] or [2], wherein the acid anhydride is a compound represented by Formula (1):

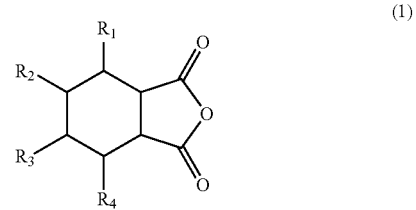

wherein, in Formula (1), $R_1$, $R_2$, $R_3$, and $R_4$ each independently represent a hydrogen atom, an alkyl group, an alkoxy group, or an aryl group, at least two of $R_1$, $R_2$, $R_3$, and $R_4$ may be linked to form a ring, or may be linked via a single bond to form a double bond.

[4] The polarizing plate protective film of any one of [1] to [3], wherein the polyfunctional (meth)acrylate compound is a compound consisting of elements selected from the group consisting of C, H, O, and N.

[5] The polarizing plate protective film of any one of [1] to [4], wherein a content of the polyfunctional (meth)acrylate compound in the photocurable composition is 40% by mass or more based on the total solid content of the photocurable composition.

[6] The polarizing plate protective film of any one of [1] to [5], wherein the substrate is a cellulose acylate film.

[7] A polarizing plate having the polarizing plate protective film of any one of [1] to [6], and a polarizer.

[8] An image display device having the polarizing plate protective film of any one of [1] to [6], or the polarizing plate of [7], wherein the image display device has the polarizing plate protective film on an outermost surface at a viewing side.

[9] A method of manufacturing the polarizing plate protective film including a substrate and a hard coat layer, the method including:

coating a photocurable composition containing a polyfunctional (meth)acrylate compound and an acid anhydride on the substrate; and curing the coated photocurable composition to form the hard coat layer, wherein a content of the acid anhydride in the photocurable composition is 8% by mass or more based on a total solid content of the photocurable composition.

According to the present invention, it is possible to provide a polarizing plate protective film with a high hardness, and a low moisture permeability.

Also, according to the present invention, it is possible to provide a polarizing plate having the polarizing plate protective film, an image display device, and a method of manufacturing the polarizing plate protective film.

DETAILED DESCRIPTION OF EXEMPLARY EMBODIMENTS

Hereinafter, preferred exemplary embodiments related to the present invention will be described in detail. The descriptions on the constituent elements to be described below may be made on the basis of a representative exemplary embodiment of the present invention, but the present invention is not limited to such an exemplary embodiment.

In the present specification, when a numerical value indicates a physical property value, a characteristic value or the like, the phrase "(numerical value 1) to (numerical value 2)" indicates a meaning of "(numerical value 1) or more and (numerical value 2) or less."

"(meth)acrylate" refers to at least one of acrylate and methacrylate, "(meth)acryl" refers to at least one of acrylic and methacrylic, and "(meth)acryloyl" refers to at least one of acryloyl and methacryloyl.

[Polarizing Plate Protective Film]

The polarizing plate protective film of the present invention is a polarizing plate protective film having a substrate and a hard coat layer, and the hard coat layer is a layer formed by curing a photocurable composition containing a polyfunctional (meth)acrylate compound and an acid anhydride, and the content of the acid anhydride in the photocurable composition is 8% by mass or more based on the total solid content of the photocurable composition.

(Hard Coat Layer)

A hard coat layer of the polarizing plate protective film of the present invention will be described.

The hard coat layer of the polarizing plate protective film of the present invention is a layer formed by curing a photocurable composition containing a polyfunctional (meth)acrylate compound and an acid anhydride.

[Polyfunctional (Meth)Acrylate Compound]

A polyfunctional (meth)acrylate compound is a compound having two or more (meth)acryloyl groups in one molecule.

In view of improving a hardness of a hard coat layer, the number of (meth)acryloyl groups in one molecule of the polyfunctional (meth)acrylate compound preferably ranges from 2 to 20, more preferably from 3 to 15, and further preferably from 4 to 12.

The polyfunctional (meth)acrylate compound may be cured with light to form a resin, and the hardness may be increased.

The polyfunctional (meth)acrylate compound is, in view of compatibility with other materials used in the hard coat layer, preferably a compound composed of only elements selected from C, H, O, and N.

As the polyfunctional (meth)acrylate compound, (meth)acrylic acid diesters of alkylene glycols, (meth)acrylic acid diesters of polyoxyalkylene glycols, (meth)acrylic acid polyvalent esters of polyhydric alcohols, (meth)acrylic acid diesters of ethylene oxides or propyleneoxide adducts of bisphenol compounds, epoxy(meth)acrylates such as a reaction product of a polyfunctional epoxy compound and a reactive group-containing polyfunctional (meth)acrylate, urethane(meth)acrylates such as a reaction product of a polyfunctional isocyanate compound and a reactive group-containing (meth)acrylate, polyester(meth)acrylates and the like may be exemplified.

As the polyfunctional (meth)acrylate compound, esters of polyhydric alcohols and (meth)acrylic acid are preferred. For example, 1,4-butanedioldi(meth)acrylate, 1,6-hexanedioldi(meth)acrylate, neopentylglycoldi(meth)acrylate, ethyleneglycoldi(meth)acrylate, triethyleneglycoldi(meth)acrylate, pentaerythritol tetra (meth)acrylate, pentaerythritol tri (meth)acrylate, trimethylolpropane tri (meth)acrylate, EO modified trimethylolpropane tri (meth)acrylate, PO modified trimethylolpropane tri (meth)acrylate, EO modified phosphoric acid tri (meth)acrylate, trimethylolethane tri (meth)acrylate, ditrimethylolpropane tetra (meth)acrylate, pentaerythritol tetra (meth)acrylate, dipentaerythritol penta (meth)acrylate, dipentaerythritol hexa (meth)acrylate and the like may be exemplified. Polyurethane polyacrylate such as a pentaerythritol triacrylatehexamethylenediisocyanateurethane prepolymer, caprolactone-modified tris (acryloxyethyl) isocyanurate and the like may be exemplified.

As the polyfunctional (meth)acrylate compound, a commercially available compound may be used, and NK ester A-TMMT, ATM-4E, A-200, manufactured by Shin Nakamura Chemical Co., Ltd., KAYARAD DPHA manufactured by Nippon Kayaku Co., Ltd., urethaneacrylate UV-1700B manufactured by Nippon Synthetic Chemical Industry Co., Ltd., Aronix M-350 manufactured by Toagosei Co., Ltd., and the like may be exemplified. The polyfunctional (meth)acrylate compound is described in paragraphs [0114] to [0122] of Japanese Patent Laid-Open Publication No. 2009-98658, and the same may also be used in the present invention.

In view of improving the hardness of the hard coat layer, the content of the polyfunctional (meth)acrylate compound in the photocurable composition for forming the hard coat layer is preferably 40% by mass or more based on the total solid content of the photocurable composition, more preferably 50% by mass or more, and further preferably 60% by mass or more. In view of reducing the moisture permeability, the content of the polyfunctional (meth)acrylate compound in the photocurable composition is preferably 40% by mass or less based on the total solid content of the photocurable composition, more preferably 50% by mass or less, and further preferably 60% by mass or less.

The total solid content of the photocurable composition refers to the total content of the photocurable composition excluding a solvent.

[Acid Anhydride]

The photocurable composition for forming the hard coat layer of the polarizing plate protective film of the present invention contains an acid anhydride.

The acid anhydride is preferably a dicarboxylic acid anhydride, and particularly preferably an alicyclic dicarboxylic acid anhydride. The alicyclic dicarboxylic acid anhydride to be used may preferably include carboxyl groups as acid anhydrides in one molecule, and take a cyclic ether-like structure, and specifically may include a backbone of succinic anhydride/maleic anhydride.

When the acid anhydride is contained in the hard coat layer, it is thought that a free volume of a resin formed by curing the polyfunimctional (meth)acrylate compound may be filled, and a moisture permeability may be reduced while a high hardness is maintained. In particular, in a case of an alicyclic dicarboxylic acid anhydride, it is thought that an effect of reducing the moisture permeability is large.

As the acid anhydride, a compound represented by Formula (1) below is preferred.

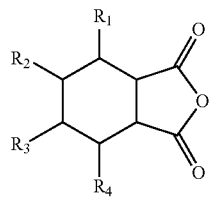
(1)

In Formula (1), $R_1$, $R_2$, $R_3$, and $R_4$ each independently represent a hydrogen atom, an alkyl group, an alkoxy group, or an aryl group. At least two of $R_1$, $R_2$, $R_3$, and $R_4$ may be linked to form a ring, or may be linked via a single bond to form a double bond.

In Formula (1), $R_1$, $R_2$, $R_3$, and $R_4$ each independently preferably represent a hydrogen atom, or an alkyl group (preferably, an alkyl group having 1 to 10 carbon atoms). An aspect in which $R_2$ and $R_3$ are linked via a single bond to form a double bond, or an aspect in which $R_1$ and $R_4$ are linked with a methylene group is preferred.

Specific examples of the acid anhydride are described below, but the present invention is not limited thereto.

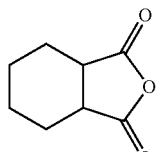
(1)-1

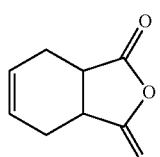
(1)-2

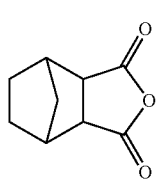
(1)-3

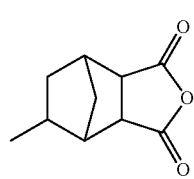
(1)-4

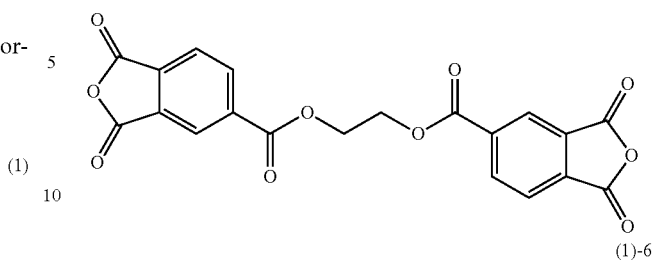
(1)-5

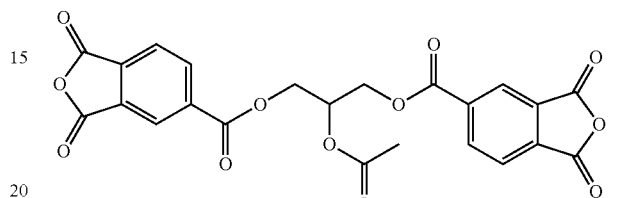
(1)-6

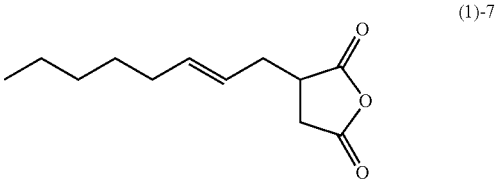
(1)-7

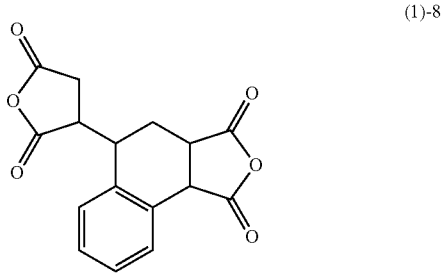
(1)-8

As the acid anhydride, a commercially available product may be used, and RIKACID HH, RIKACID TH, RIKACID HNA100, RIKACID MH, RIKACID TMEG-S, RIKACID TMTA-C, RIKACID OSA, RIKACID TDA-100 and the like manufactured by New Japan Chemical Co., Ltd. may be exemplified.

In view of reducing the moisture permeability of the hard coat layer, the content of the acid anhydride in the photocurable composition for forming the hard coat layer is 8% by mass or more based on the total solid of the photocurable composition, and more preferably 10% by mass or more. In view of increasing the hardness, the content of the acid anhydride in the photocurable composition is preferably 20% by mass or less based on the total solid of the photocurable composition.

[Other Components]

The photocurable composition for forming the hard coat layer of the present invention contains the polyfunctional (meth)acrylate compound and the acid anhydride, but may contain other components.

[Polyfunctional Epoxy Monomer]

The photocurable composition for forming the hard coat layer of the present invention may contain a polyfunctional epoxy monomer. The polyfnictional epoxy monomer is preferably a polyfunctional epoxy monomer having two or more epoxy rings and at least one cyclic skeleton other than an epoxy ring in one molecule. When the polyfunctional epoxy monomer is contained, the content is preferably 0% by mass or more and 50% by mass or less, and more preferably 0% by mass or more and 30% by mass or less based on the total solid content in the photocurable composition for forming the hard coat layer.

As the cyclic skeleton other than an epoxy ring, which is contained in the polyfimnctional epoxy monomer, a cycloalkane ring such as a cyclohexane ring, a cyclopentane ring, a cyclooctane ring, or a bicycloheptane ring is preferred, and a cyclohexane ring is more preferred. The cyclic skeleton other than an epoxy ring may be condensed with an epoxy ring.

Specific examples of the polyfunctional epoxy monomer will be described below, but the present invention is not limited thereto.

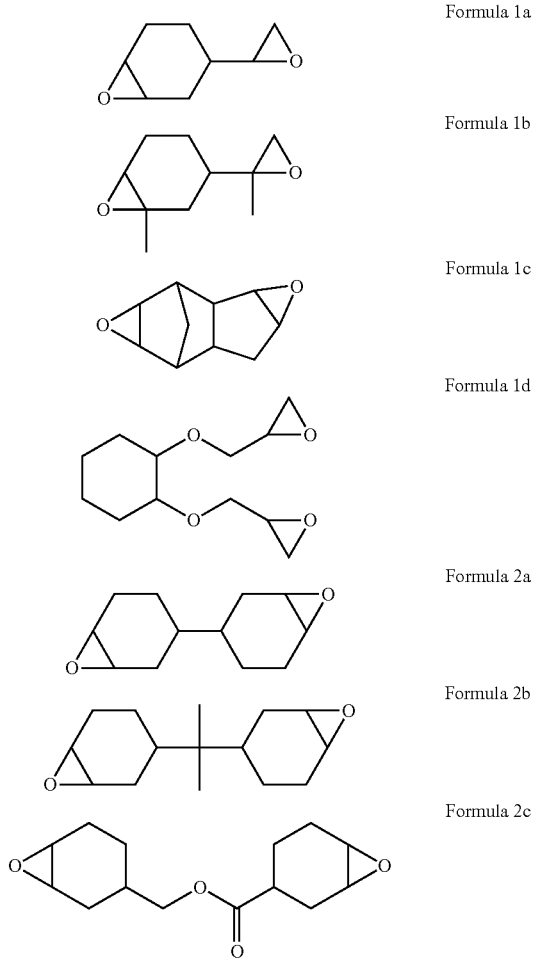

Formula 1a

Formula 1b

Formula 1c

Formula 1d

Formula 2a

Formula 2b

Formula 2c

[Photocationic Polymerization Initiator]

The epoxy ring contained in the polyfunctional epoxy monomer results in a polymerization reaction when an active energy is irradiated in the presence of a photocationic polymerization initiator. Thus, when the polyfunctional epoxy monomer is contained, it is preferable to contain the photocationic polymerization initiator. As the photocationic polymerization initiator, a sulfonium salt, an iodonium salt, a diazonium salt and the like may be used, and specifically, "Irgacure 290 (trade name, BASF Corporation)", "Irgacure 250 (same)", "Irgacure 270 (same)", "CPI-100P (trade name, San-Apro Co., Ltd.)", "CPI-101A (same)", "CPI-200K (same)", "CPI-210S (same)" and the like may be used.

When the polyfunctional epoxy monomer is contained, the content of the photocationic polymerization initiator preferably ranges from 0.5% by mass to 8% by mass and more preferably from 1% by mass to 5% by mass based on the total solid content in the photocurable composition for forming the hard coat layer because settings need to be made such that an epoxy ring is polymerized, and the initiation point is suppressed from being overly increased.

[Solvent]

The photocurable composition for forming the hard coat layer of the present invention may contain a solvent. As the solvent, various solvents may be used in consideration of a solubility of a polyfunctional (meth)acrylate compound and an acid anhydride, a drying property at the time of coating and the like. As an organic solvent, for example, dibutyl ether, dimethoxyethane, diethoxyethane, propylene oxide, 1,4-dioxane, 1,3-dioxolane, 1,3,5-trioxane, tetrahydrofuran, anisole, phenetole, dimethyl carbonate, methyl carbonate ethyl, diethyl carbonate, acetone, methyl ethyl ketone (MEK), diethyl ketone, methyl isobutyl ketone (MiBK), 2-octanone, 2-pentanone, 2-hexanone, dipropyl ketone, diisobutyl ketone, cyclopentanone, cyclohexanone, methylcyclohexanone, acetyl acetone, ethyl formate, propyl formate, pentyl formate, methyl acetate, ethyl acetate, propyl acetate, isobutyl acetate, propionate methyl, ethyl propionate, γ-butyrolactone, 2-methoxy methyl acetate, 2-ethoxy methyl acetate, 2-ethoxyethyl acetate, 2-ethoxy ethyl propionate, methyl acetoacetate, ethyl acetoacetate, 2-methoxyethanol, 2-ethoxyethanol, 2-propyloxy ethanol, 2-butoxyethanol, 1,2-diacetoxy acetone, diacetone alcohol, methyl alcohol, ethyl alcohol, isopropyl alcohol, n-butyl alcohol, cyclohexyl alcohol, ethylene glycol butyl ether, propylene glycol methyl ether, ethyl carbitol, butyl carbitol, propylene glycol methyl ether acetate, hexane, heptane, octane, cyclohexane, methylcyclohexane, ethylcyclohexane, benzene, toluene, xylene, and the like may be exemplified, and the solvent may be used either alone or in combination of two or more thereof.

Among the solvents described above, at least one kind of methyl acetate, ethyl acetate, methyl ethyl ketone, methyl isobutyl ketone, acetyl acetone, acetone, cyclohexanone, toluene, and xylene may be preferably used.

The photocurable composition for forming the hard coat layer may be diluted with a solvent so that the concentration of solids preferably ranges from 10% by mass to 80% by mass, more preferably from 20% by mass to 75% by mass, and further preferably from 30% by mass to 70% by mass.

[Photo-Radical Polymerization Initiator]

The photocurable composition for forming the hard coat layer of the present invention preferably contains a photoradical polymerization initiator.

As the photo-radical polymerization initiator, acetophenones, benzoins, benzophenones, phosphine oxides, oximes, ketals, anthraquinones, thioxanthones, azo compounds, peroxides, disulfide compounds, lophine dimers, onium salts, borate salts, active esters, active halogens, inorganic complexes, coumarins, and the like may be exemplified. Specific examples, preferred aspects, commercially available products and the like of the photopolymerization initiator are described in paragraphs [0133] to [0151] of Japanese Patent Laid-Open Publication No. 2009-098658, and may also be suitably used in the present invention.

Various examples are described in "The Latest UV Curing Techniques," Technical Information Institute Co., Ltd. (1991), p. 159, and in "Ultraviolet Curing System", Kiyomi Kato (Pub. Sougou Gijyutsu Center, 1989), pp. 65 to 148, which are useful in the present invention.

As a commercially available photo-cleavage type photo-radical polymerization initiator, "Irgacure 651". "Irgacure 184", "Irgacure 819", "Irgacure 907", "Irgacure 1870" (CGI-403/Irgacure 184=7/3 mixed initiator), "Irgacure 500", "Irgacure 369", "Irgacure 1173", "Irgacure 2959". "Irgacure 4265", "Irgacure 4263", "Irgacure 127", "Irgacure OXE01" and the like manufactured by BASF corporation (manufactured by formerly Ciba Specialty Chemicals Co., Ltd.); "Kayacure DETX-S", "Kayacure BP-100", "Kayacure BDMK", "Kayacure CTX", "Kayacure BMS", "Kayacure 2-EAQ", "Kayacure ABQ". "Kayacure CPTX", "Kayacure EPD". "Kayacure ITX", "Kayacure QTX", "Kayacure BTC", "Kayacure MCA" and the like manufactured by Nippon Kayaku Co., Ltd.; "Esacure (KIP100F, KBI, EB3, BP, X33, KTO46, KT37, KIP150, TZT)" manufactured by Sartomer Co., Ltd, and the like, and combinations thereof may be preferably exemplified.

The content of the photo-radical polymerization initiator in the photocurable composition for forming the hard coat layer preferably ranges from 0.5% by mass to 8% by mass, and more preferably from 1% by mass to 5% by mass based on the total solid content of the photocurable composition.

The photocurable composition for forming the hard coat layer may contain various additives such as a UV absorber, a surfactant, a weather resistance improving agent, a hardness improving agent, an antiglare property imparting agent, and a slipperiness imparting agent.

[Film Thickness of Hard Coat Layer]

The film thickness of the hard coat layer preferably ranges from 2 μm to 30 μm, more preferably from 3 μm to 20 μm, and further preferably from 4 μm to 15 μm. When the film thickness of the hard coat layer is 2 μm or more, it is possible to obtain a sufficient hardness and to reduce a moisture permeability. When the film thickness is 30 μm or less, it is easy to dry the layer in a coating and drying step on a substrate, and it is possible to obtain an excellent brittleness.

The film thickness of the hard coat layer may be obtained from a difference between film thicknesses measured before and after the hard coat layer is laminated on a substrate.

(Substrate)

A substrate of the polarizing plate protective film of the present invention will be described.

It is desirable that the substrate has a higher transparency, and a transmittance of visible light of 80% or more.

As the substrate, a substrate containing a cellulose-based resin; a cellulose acylate (triacetyl cellulose, diacetyl cellulose, cellulose acetate butyrate), and a polyester resin; polyethylene terephthalate, a (meth) acrylic resin, a polyurethane resin, a polycarbonate resin, a polystyrene resin, a (cyclic)olefin-based resin or the like may be exemplified. In view of easily manufacturing a permeation layer, a substrate containing cellulose acylate, polyethylene terephthalate, or (meth)acrylic resin is preferred, and a substrate containing cellulose acylate is more preferred.

[Cellulose Acylate Film]

As the cellulose acylate film, for example, a cellulose triacetate film (refractive index 1.48), a cellulose diacetate film, a cellulose acetate butyrate film, a cellulose acetate propionate film, or the like is preferred.

The thickness of the cellulose acylate film generally ranges from about 15 μm to 1000 μm, and particularly preferably from 20 μm to 80 μm.

(Functional Layer)

The polarizing plate protective film of the present invention may further include other functional layers other than the hard coat layer. The kind of the functional layer is not particularly limited, but examples thereof may include an anti-reflection layer (a refractive index-controlled layer such as a low refractive index layer, a medium refractive index layer, and a high refractive index layer), an antiglare layer, an antistatic layer, a ultraviolet light absorbing layer, an adhesion layer (a layer for improving the adhesion between the substrate and the hard coat layer) and the like.

The functional layer may be a single layer, or a plurality of functional layers may be formed. A method of laminating a functional layer is not particularly limited.

The functional layer may be laminated on a surface of the substrate not laminated with the hard coat layer.

(Anti-Reflection Layer)

In the present invention, an anti-reflection layer may be laminated on a low moisture permeability hard coat layer. As the anti-reflection layer, conventionally known layers may be preferably used, and among them, a UV curable anti-reflection layer is preferred.

(Moisture Permeability of Polarizing Plate Protective Film)

The moisture permeability of the polarizing plate protective film of the present invention is preferably 230 g/m$^2$/day or less, more preferably 200 g/m$^2$/day or less, and further preferably 170 g/m$^2$/day or less in view of deterioration suppression of a polarization performance of the polarizing plate under conditions of high temperature and high humidity. The moisture permeability of the polarizing plate protective film is preferably 50 g/m$^2$/day or more in view of easy moisture loss at the time of manufacturing the polarizing plate.

Here, the moisture permeability is a value after a lapse of 24 hours at 40° C. and RH 90% in accordance with the method defined in JIS Z-0208 (1976).

<Layer Configuration of Polarizing Plate Protective Film>

The polarizing plate protective film of the present invention includes a hard coat layer formed on a substrate. Between the substrate and the hard coat layer, another layer may be interposed.

Preferred examples of a layer configuration of the polarizing plate protective film of the present invention are described below, but the present invention is not particularly limited to these layer configurations.

substrate/hard coat layer
substrate/hard coat layer/anti-reflection layer
substrate/adhesion layer/hard coat layer
substrate/adhesion layer/hard coat layer/anti-reflection layer
substrate/ultraviolet light absorbing layer/hard coat layer
substrate/ultraviolet light absorbing layer/hard coat layer/anti-reflection layer
substrate/adhesion layer/ultraviolet light absorbing layer/hard coat layer
substrate/adhesion layer/ultraviolet light absorbing layer/hard coat layer/anti-reflection layer
substrate/hard coat layer/antiglare layer
substrate/hard coat layer/antiglare layer/anti-reflection layer

[Optically Anisotropic Layer]

The polarizing plate protective film of the present invention may further include an optically anisotropic layer. The optically anisotropic layer may be an optically anisotropic layer having a film with a constant phase difference which is uniformly formed in plane, or an optically anisotropic layer with different slow axis directions or different phase difference sizes, which forms a pattern in which phase difference regions are regularly disposed in plane.

The optically anisotropic layer is preferably formed on a surface opposite to a surface of the substrate formed with the hard coat layer.

Meanwhile, when the hard coat layer is laminated on the substrate, at the same side as the optically anisotropic layer, the hard coat layer may be laminated between the substrate and the optically anisotropic layer, and the substrate, the optically anisotropic layer, and the hard coat layer may be sequentially laminated.

As a preferred example having the optically anisotropic layer uniformly formed in plane, an embodiment in which an optically anisotropic layer of λ/4 film may be exemplified, which is particularly useful as a member of an active type of 3D liquid crystal display device.

An embodiment in which the optically anisotropic layer of λ/4 film and the hard coat layer are laminated at opposite surfaces through a substrate is described in Japanese Patent Laid-Open Publication No. 2012-098721, Japanese Patent Laid-Open Publication No. 2012-127982, and this embodiment may be preferably used in the polarizing plate protective film of the present invention.

Meanwhile, as a preferred example of the optically anisotropic layer forming a pattern, a pattern type λ/4 film may be exemplified, and embodiments described in Japanese Patent Nos. 4825934, and 4887463 may be preferably used in the polarizing plate protective film of the present invention.

An embodiment described in Japanese National Publication of International Patent Application No. 2012-517024 (Publication NO. WO2010/090429), in which a photo alignment film and a pattern exposure are combined, may also be preferably used in the polarizing plate protective film of the present invention.

[Manufacturing Method of Polarizing Plate Protective Film]

The manufacturing method of the polarizing plate protective film of the present invention is a manufacturing method of a polarizing plate protective film having a substrate and a hard coat layer, and includes a step of coating a photocurable composition containing a polyfunctional (meth)acrylate compound and an acid anhydride on a substrate, and curing the coated photocurable composition to form the hard coat layer, in which the content of the acid anhydride in the photocurable composition is 8% by mass or more based on the total solid content of the photocurable composition.

As a method of coating the photocurable composition for forming the hard coat layer on the substrate, a dip coating method, an air knife coating method, a curtain coating method, a roller coating method, a wire bar coating method, a gravure coating method, a die coating method and the like may be exemplified. A micro gravure coating method, a wire bar coating method, and a die coating method (see, e.g., U.S. Pat. No. 2,681,294, Japanese Patent Laid-Open Publication No. 2006-122889) are more preferred, and a die coating method is particularly preferred.

In the manufacturing method of the polarizing plate protective film of the present invention, it is desirable that after the photocurable composition for forming the hard coat layer is coated on the substrate, the photocurable composition is cured with irradiation of UV light to form the hard coat layer. Here, the illuminance of the UV light preferably ranges from 10 mW/cm$^2$ to 5000 mW/cm$^2$, and the irradiation dose preferably ranges from 10 mJ/cm$^2$ to 10000 mJ/cm$^2$. The irradiation of UV light is preferably performed under a low oxygen concentration, specifically at an oxygen concentration of 1000 ppm or less.

[Polarizing Plate]

The polarizing plate of the present invention includes a polarizer, and the polarizing plate protective film of the present invention formed as a protective film on at least one side surface of the polarizer.

The polarizing plate of the present invention may include a polarizer, and the polarizing plate protective film of the present invention formed as a protective film on one side surface of the polarizer, and an optically anisotropic film formed the other side surface of the polarizer. In this case, the optically anisotropic film may be the same as the optically anisotropic layer described above.

In the present invention, the manufacturing method of the polarizing plate is not particularly limited, but the polarizing plate may be manufactured by a general method. There is a method in which the obtained polarizing plate protective film is alkali-treated, and is bonded to both surfaces of a polarizer manufactured by immersing and stretching a polyvinyl alcohol film in an iodine solution, using a completely saponified polyvinyl alcohol aqueous solution. Instead of the alkali treatment, an easy adhesion processing as described in Japanese Patent Laid-Open Publication No. H6-94915, and Japanese Patent Laid-Open Publication No. H6-118232, may be performed. The surface treatment as described above may be performed. The surface of the polarizing plate protective film to be bonded to the polarizer may be either a surface laminated with the low moisture permeability hard coat layer, or a surface not laminated with the low moisture permeability hard coat layer.

As an adhesive used to bond the protective film-treated surface to the polarizer, for example, polyvinyl alcohol-based adhesives such as polyvinyl alcohol, polyvinyl butyral or the like, vinyl-based latexes such as butyl acrylate and the like may be exemplified.

The polarizing plate is composed of a polarizer and protective films for protecting both surfaces of the polarizer, and is further composed of a protect film bonded to one side surface of the polarizing plate, and a separate film bonded to the other side surface. The protect film and the separate film are used for the purpose of protecting the polarizing plate at the time of shipping of the polarizing plate, inspecting a product or the like. In this case, the protect film is bonded for the purpose of protecting the top surface of the polarizing plate, and is used at a surface side opposite to the surface of the polarizing plate to be bonded to a liquid crystal plate. The separate film is used for the purpose of covering the adhesive layer to be bonded to the liquid crystal plate, and is used at a surface side of the polarizing plate to be bonded to the liquid crystal plate.

[Image Display Device]

The image display device of the present invention includes a liquid crystal cell and the polarizing plate of the present invention which is disposed at least one side of the liquid crystal cell, in which the polarizing plate protective film of the present invention included in the polarizing plate is disposed at an image display surface, or an image non-display surface. As the image display device, a liquid crystal display device (LCD), a plasma display panel (PDP), an electroluminescence display (ELD), a cathode ray tube display device (CRT) and the like may be exemplified, but the polarizing plate of the present invention may be preferably used in particularly a liquid crystal display device.

EXAMPLES

The present invention will be described in detail with reference to following examples, but the present invention is not limited to these examples.

Example 1

Preparation of Photocurable Composition for Forming Hard Coat Layer

Respective components were mixed in a following composition, and filtered through a polypropylene filter having a pore diameter of 5 µm to prepare a hard coat layer forming photocurable composition.

<Composition of Hard Coat Layer Forming Photocurable Composition>

| | |
|---|---|
| DPHA | 38.45 parts by mass |
| M-350 | 38.45 parts by mass |
| RIKACID HH | 20.0 parts by mass |
| Irgacure 184 | 3.08 parts by mass |
| Surfactant (Megafac F784F) | 0.02 parts by mass |
| Methyl ethyl ketone | 50.0 parts by mass |
| Methyl isobutyl ketone | 100.0 parts by mass |

DPHA: mixture of dipentaerythritol pentaacrylate and dipentaerythritol hexaacrylate (manufactured by Nippon Kayaku Co., Ltd.)
M-350: trimethylolpropane EO-modified triacrylate manufactured by Toagosci Co., Ltd.

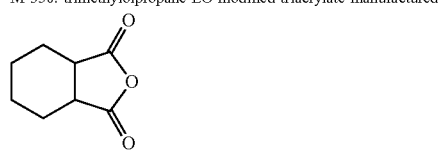

RIKACID HH (manufactured by New Japan Chemical Co., Ltd.)
Irgacure 184: photo-radical polymerization initiator manufactured by BASF
Megafac F784F (manufactured by Dainippon Ink Co., Ltd.) is a polymer having the following structure. The ratio of each repeating unit is a mass ratio.

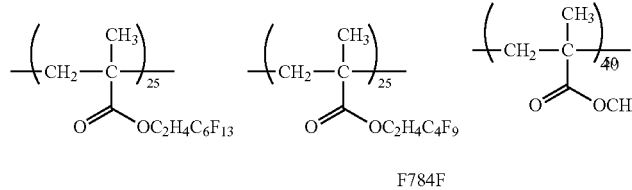

F784F

<Coating for Forming Hard Coat Layer>

FUJITAC TG60 (manufactured by Fuji film Co., Ltd., width 1340 mm, thickness 60 µm) as a substrate was unwound from a roll form, and the hard coat layer forming photocurable composition was coated by a die coating method using a slot die as described in Example 1 of Japanese Patent Laid-Open Publication No. 2006-122889, under a condition of a conveying speed of 30 m/min, and was dried for 150 sec at a substrate temperature of 60° C. by controlling the temperature within coating equipment. The temperature was measured by PT-2LD manufactured by OPTEX Inc. Then, further, the coated layer was cured with irradiation of UV light (illuminance of 400 mW/cm², and irradiation dose of 300 mJ/cm²) under nitrogen purge, at an oxygen concentration of about 0.1 vol %, at the substrate temperature of 25° C., using air-cooled metal halide lamp of 160 W/cm (manufactured by Eye Graphics Co., Ltd.), and was wound to obtain a hard coat layer. A polarizing plate protective film having the hard coat layer was set as sample 1 (Example 1). The coating amount was adjusted so that the film thickness of the hard coat layer becomes 10 µm.

Examples 2 to 11, Comparative Examples 1 to 4

Then, a hard coat layer forming photocurable composition was prepared in the same manner as in Example 1 except that kinds and addition amounts of a polyfunctional (meth)acrylate compound, an acid anhydride, bisphenol C, other monomers, a photo-radical polymerization initiator, a photocationic polymerization initiator 1, and a surfactant were changed as noted in Table 1 below.

By using the obtained hard coat layer forming photocurable compositions, polarizing plate protective film samples 2 to 11 (Examples 2 to 11), and comparative polarizing plate protective film samples 1 to 4 (Comparative Examples 1 to 4) were obtained in the same manner as in Example 1.

In Table 1, the addition amount of each component is on the basis of parts by mass.

The used materials are described below.

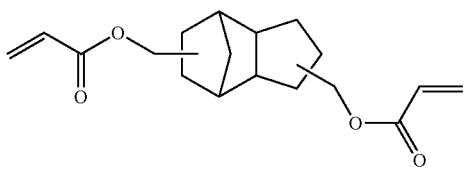

ADCP
(manufactured by Shin Nakamura Chemical Co., Ltd.)

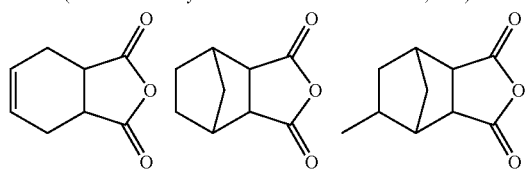

RIKACID TH
(manufactured by New Japan Chemical Co., Ltd.)

RIKACID HNA 100 (mixture of the above compounds) (manufactured by New Japan Chemical Co., Ltd.)

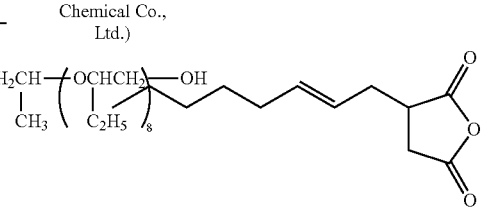

RIKACID OSA
(manufactured by New Japan Chemical Co., Ltd.)

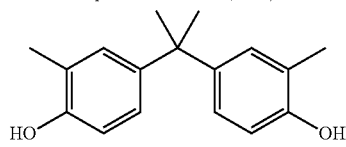

Bisphenol C
(manufactured by Honshu Chemical Industry Co., Ltd.)

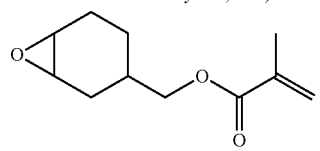

Cyclomer M100
(manufactured by Daicel Chemical Industries Co., Ltd.)

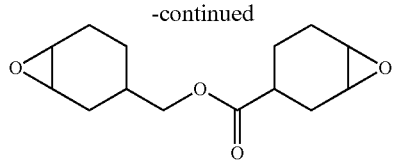

CEL2021P
(manufactured by Daicel
Chemical Industries Co., Ltd.)

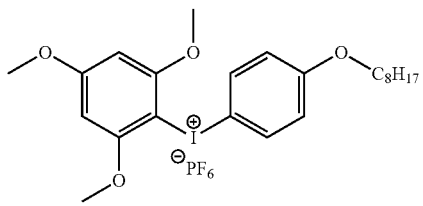

Photocationic Polymerization Initiator 1

[Evaluation of Polarizing Plate Protective Film]

Moisture permeability (moisture permeability at 40° C. and RH 90%)

The polarizing plate protective film sample 70 mmφ of each of Examples and Comparative Examples was humidified at 40'C, and RH 90% for 24 hours, and measured by the method defined in JIS Z-0208 (1976). In the present invention, it is desirable that the moisture permeability per thickness 10 μm is 230 g/m²/day or less.

Pencil Hardness Test

The pencil hardness test described in JIS K 5600-5-4 (1999) was performed. The polarizing plate protective film was humidified at a temperature of 25° C. and a relative humidity (RH) of 60% for 2 hours, and was tested using 2B-4H test pencils defined in JIS S 6006(2007) under a load of 4.9 N based on the following determination. The highest hardness to be OK was set as a rated value. In the present invention, the pencil hardness is preferably H or higher.

OK: four or more determinations of no scratch at tests (n=5)

NG: three or less determinations of no scratch at tests (n=5)

TABLE 1

| | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| (A) | Polyfunctional acrylic monomer | DPHA | 38.45 | 43.26 | 44.22 | 43.26 | 43.26 | 34.61 | 33.84 | 34.61 | 18.26 |
| (A) | | M-350 ADCP | 38.45 | 43.26 | 44.22 | 43.26 | 43.26 | 34.61 | 33.84 | 34.61 | 18.26 |
| (B) | acid anhydride | RIKACID HH | 20.0 | 10.0 | 8.0 | | | 10.0 | 10.0 | 10.0 | 10.0 |
| (B) | | RIKACID TH | | | | 10.0 | | | | | |
| (B) | | RIKACID HNA100 | | | | | 10.0 | | | | |
| (B) | | RIKACID OSA | | | | | | | | | |
| | other monomers | bisphenol C cyclomer M100 | | | | | | | 17.3 | 8.5 | 8.7 | 25.0 |
| | | CEL2021P | | | | | | | | 8.5 | 8.7 | 25.0 |
| | polymerization initiator | Irg184 | 3.08 | 3.46 | 3.54 | 3.46 | 3.46 | 3.46 | 3.38 | 3.46 | 3.46 |
| | | photocationic polymerization initiator 1 | | | | | | | | 2.00 | | |
| | others | surfactant | 0.02 | 0.02 | 0.02 | 0.02 | 0.02 | 0.02 | 0.02 | 0.02 | 0.02 |
| | moisture permeability | g/m²/day@10 μm | 150 | 160 | 180 | 170 | 190 | 140 | 150 | 140 | 200 |
| | pencil hardness | | 3H | 3H | 4H | 3H | 3H | 2H | 2H | 2H | H |

| | | | Ex. 10 | Ex. 11 | C. Ex. 1 | C. Ex. 2 | C. Ex. 3 | C. Ex. 4 |
|---|---|---|---|---|---|---|---|---|
| (A) | Polyfunctional acrylic monomer | DPHA | 38.45 | | 43.26 | 45.18 | 48.07 | 43.26 |
| (A) | | M-350 ADCP | | 38.5 | 43.26 | 45.18 | 48.07 | 43.26 |
| (B) | acid anhydride | RIKACID HH | 20.0 | | | 6.0 | | 10.0 |
| (B) | | RIKACID TH | | | | | | |
| (B) | | RIKACID HNA100 | | | | | | |
| (B) | | RIKACID OSA | | | 10.0 | | | |
| | other monomers | bisphenol C cyclomer M100 | | | | | 42.3 | 10.0 |
| | | CEL2021P | | | | | 42.3 | |
| | polymerization initiator | Irg184 | 3.08 | 3.46 | 3.61 | 3.85 | 3.38 | 3.46 |
| | | photocationic polymerization initiator 1 | | | | | 2.00 | |

TABLE 1-continued

| | | | | | | | |
|---|---|---|---|---|---|---|---|
| others | surfactant | 0.02 | 0.02 | 0.02 | 0.02 | 0.02 | 0.02 |
| moisture permeability | g/m²/day@10 μm | 150 | 160 | 260 | 320 | 250 | 170 |
| pencil hardness | | H | H | 3H | 3H | H | F |

[Manufacturing of Liquid Crystal Display Device]

A liquid crystal display device was manufactured using each polarizing plate protective film manufactured by the above described method.

<Manufacturing of Polarizing Plate>

1) Saponification of Film

A commercially available cellulose acylate film (FUJITAC ZRD40, manufactured by Fuji film Co., Ltd), a commercially available FUJITAC TC60 (manufactured by Fuji film Co., Ltd), and the polarizing plate protective film sample of Example 1 of the present invention, which was prepared as described above, were immersed in aqueous NaOH solution (saponification solution, 1.5 mol/L) maintained at 55° C., for 2 min. Each film was washed, immersed in a sulfuric acid aqueous solution (0.05 mol/L) of 25° C. for 30 sec, and was further allowed to pass through a washing bath for 30 sec under running water so that the film was placed in a neutral state. Then, draining by air knife was repeated three times, and water was dropped on the film and stayed and dried in a drying zone of 70° C. for 15 sec so that the saponified film was manufactured.

2) Manufacturing of Polarizer

According to Example 1 of Japanese Patent Laid-Open Publication No. 2001-141926, a stretched polyvinyl alcohol film was allowed to adsorb iodine, so as to manufacture a polarizer with a film thickness of 20 μm.

3) Bonding (Manufacturing of Front Side Polarizing Plate)

The saponified polarizing plate protective film of Example 1 of the present invention (a surface of the polarizing plate protective film not laminated with a hard coat layer is disposed to be in contact with a polarizer), the polarizer manufactured as described above, and the saponified cellulose acylate film ZRD40 were sequentially bonded by a PVA-based adhesive, and thermally dried to prepare a polarizing plate.

Here, in each example, the arrangement was made such that the longitudinal direction of a roll of the manufactured polarizer and the longitudinal direction of the polarizing plate protective film were parallel to each other. Also, the arrangement was made such that the longitudinal direction of a roll of the polarizer and the longitudinal direction of a roll of the cellulose acylate film ZRD40 were parallel to each other.

The durability of the polarizing plate manufactured as described above was measured by a change in an orthogonal transmittance at a wavelength of 680 nm using an automatic polarizing film measurement device VAP-7070 manufactured by JASCO Co., Ltd. before and after the polarizing plate was left under a condition of 60° C., RH 95% for 500 hours. The amount of change in the orthogonal transmittance after the test was good (less than 0.1%).

(Manufacturing of Rear Side Polarizing Plate)

The saponified cellulose acylate film TG60, the stretched iodine PVA polarizer, and the saponified cellulose acylate film ZRD40 were sequentially bonded by a PVA-based adhesive, and thermally dried to obtain a rear side polarizing plate.

Here, the arrangement was made such that the longitudinal direction of a roll of the manufactured polarizer and the longitudinal direction of the cellulose acylate film TG60 were parallel to each other. Also, the arrangement was made such that the longitudinal direction of a roll of the polarizer and the longitudinal direction of a roll of the cellulose acylate film ZRD40 were parallel to each other.

<Mounting in IPS Panel>

Top and bottom polarizing plates of an IPS mode liquid crystal cell (42LS5600 manufactured by LGD) were separated, and one polarizing plate of the present invention serving as a front side polarizing plate, and one polarizing plate as described serving as a rear side polarizing plate were adhered at the front side (viewing side), and at the rear side, respectively by an adhesive such that each cellulose acylate film ZRD40 was placed at the liquid crystal cell side. Thus, a liquid crystal display device was obtained. A cross nicol arrangement was made such that the absorption axis of the polarizing plate at the front side was a longitudinal direction (the lateral direction), and the transmission axis of the polarizing plate at the rear side was a longitudinal direction (the lateral direction). The thickness of the glass used for the liquid crystal cell was 0.5 mm. Even when the polarizing plate that was subjected to the durability test under a high temperature and high humidity environment was used, a contrast deterioration was hardly seen but the contrast was good.

What is claimed is:

1. A polarizing plate protective film comprising a substrate and a hard coat layer,
    wherein the hard coat layer is a layer formed by curing a photocurable composition containing a polyfunctional (meth)acrylate compound and an acid anhydride,
    wherein a content of the acid anhydride in the photocurable composition is 8-20% by mass based on a total solid content of the photocurable composition,
    wherein a content of the polyfunctional (meth)acrylate compound in the photocurable composition is 40-88.44% by mass based on the total solid content of the photocurable composition, and
    wherein the acid anhydride is contained in the hard coat layer.

2. The polarizing plate protective film of claim 1,
    wherein the acid anhydride is an alicyclic dicarboxylic acid anhydride.

3. The polarizing plate protective film of claim 1,
    wherein the acid anhydride is a compound represented by Formula (1):

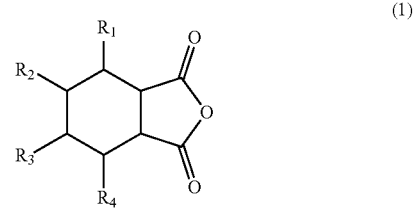

wherein in Formula (1), $R_1$, $R_2$, $R_3$, and $R_4$ each independently represent a hydrogen atom, an alkyl group, an alkoxy group, or an aryl group, at least two of $R_1$, $R_2$, $R_3$, and $R_4$ may be linked to form a ring, or may be linked via a single bond to form a double bond.

4. The polarizing plate protective film of claim 1, wherein the polyfunctional (meth)acrylate compound is a compound consisting of elements selected from the group consisting of C, H, O, and N.

5. The polarizing plate protective film of claim 1, wherein the substrate is a cellulose acylate film.

6. A polarizing plate comprising the polarizing plate protective film of claim 1, and a polarizer.

7. An image display device comprising the polarizing plate protective film of claim 1, wherein the image display device has the polarizing plate protective film on an outermost surface at a viewing side.

8. A method of manufacturing a polarizing plate protective film including a substrate and a hard coat layer, the method comprising:
   coating a photocurable composition containing a polyfunctional (meth)acrylate compound and an acid anhydride on the substrate; and
   curing the coated photocurable composition to form the hard coat layer,
   wherein a content of the acid anhydride in the photocurable composition is 8-20% by mass based on a total solid content of the photocurable composition,
   wherein a content of the polyfunctional (meth)acrylate compound in the photocurable composition is 40-88.44% by mass based on the total solid content of the photocurable composition, and
   wherein the acid anhydride is contained in the hard coat layer.

* * * * *